(12) United States Patent
Schiff

(10) Patent No.: US 11,661,199 B2
(45) Date of Patent: May 30, 2023

(54) REMOVABLE AUXILIARY AIR CONDITIONING SYSTEM FOR A CONFINED AREA

(71) Applicant: Peter Schiff, Cookeville, TN (US)

(72) Inventor: Peter Schiff, Cookeville, TN (US)

(*) Notice: Subject to any disclaimer, the term of this patent is extended or adjusted under 35 U.S.C. 154(b) by 442 days.

(21) Appl. No.: 16/659,537

(22) Filed: Oct. 21, 2019

(65) Prior Publication Data

US 2021/0114737 A1 Apr. 22, 2021

(51) Int. Cl.
*B64D 13/08* (2006.01)
*B64D 13/06* (2006.01)

(52) U.S. Cl.
CPC ............ *B64D 13/08* (2013.01); *B64D 13/06* (2013.01); *B64D 2013/064* (2013.01); *B64D 2013/0611* (2013.01); *B64D 2013/0644* (2013.01); *B64D 2013/0655* (2013.01); *B64D 2221/00* (2013.01)

(58) Field of Classification Search
CPC ..................... B64D 13/08; B64D 13/06; B64D 2013/0611; B64D 2013/064; B64D 2013/0644; B64D 2013/0655; B64D 2221/00
See application file for complete search history.

(56) References Cited

U.S. PATENT DOCUMENTS

| | | | |
|---|---|---|---|
| 2,251,960 A * | 8/1941 | Smith | F24F 1/022 62/262 |
| 3,319,979 A * | 5/1967 | Herold | F16L 37/23 285/332.1 |
| 3,583,658 A * | 6/1971 | Herweg | B64D 13/08 62/243 |
| 4,098,093 A | 7/1978 | Czyl | |
| 4,430,867 A * | 2/1984 | Warner | B64D 13/06 62/402 |
| 4,450,900 A | 5/1984 | Nathan | |
| 4,490,989 A | 1/1985 | Keen | |
| 4,674,294 A | 6/1987 | D'Agaro | |
| 6,105,383 A | 8/2000 | Reimann et al. | |
| 6,422,030 B1 | 7/2002 | Calvert | |
| 7,543,458 B1 | 6/2009 | Wurth | |
| 9,376,212 B2 * | 6/2016 | Liebich | B64D 13/02 |

(Continued)

FOREIGN PATENT DOCUMENTS

WO WO-2013136286 A2 * 9/2013 ........... B60R 16/033

*Primary Examiner* — Gordon A Jones
(74) *Attorney, Agent, or Firm* — LaMorte & Associates P.C.

(57) ABSTRACT

An air conditioning system that is designed to be retroactively added to, and removed from, an existing aircraft, vehicle, boat or similar confined space. The air conditioning system includes a cooler module that is carried into a first compartment to circulate and cool the air. The cooler module contains a condenser, an evaporator and a compressor. A heat exchanger module is mounted into a vented second compartment. The heat exchanger is capable of exchanging heat with the ambient air. The heat exchanger module is connected to the cooler module with tubes that contain a heat exchanger fluid. In order for the tubes to pass through a compartment barrier, fluid couplings are mounted through the barrier. The tubes connect to the fluid couplings on either side of the barrier. A control unit is provided within the pressurized cabin and/or cockpit for controlling the operations of the cooler module.

13 Claims, 6 Drawing Sheets

(56) References Cited

U.S. PATENT DOCUMENTS

| | | | |
|---|---|---|---|
| 9,617,005 B1* | 4/2017 | Schiff | B64D 13/00 |
| 10,392,122 B2* | 8/2019 | Klimpel | A62C 3/08 |
| 2004/0103600 A1* | 6/2004 | Broder | H02G 3/22 |
| | | | 52/220.8 |
| 2015/0266353 A1* | 9/2015 | Lu | B64D 13/08 |
| | | | 62/506 |
| 2020/0284191 A1* | 9/2020 | Kroeger | F02C 7/047 |
| 2020/0386452 A1* | 12/2020 | Langebach | F25D 21/14 |
| 2021/0071545 A1* | 3/2021 | Kroeger | F01D 25/02 |

* cited by examiner

REMOVABLE AUXILIARY AIR CONDITIONING SYSTEM FOR A CONFINED AREA

BACKGROUND OF THE INVENTION

1. Field of the Invention

In general, the present invention relates to air conditioning systems for aircraft, motor vehicles, boats and other confined spaces. More particularly, the present invention relates to auxiliary air conditioning systems that can be selectively added to, or removed from, a confined space as desired by the owner.

2. Prior Art Description

Confined spaces, such as vehicles, boats, aircraft and even rooms in homes typically require air conditioning in order to remain comfortable in warm weather. However, for many reasons, air conditioning systems are not always available. For instance, low flying, relatively slow aircraft often do not have air conditioning systems for the inside of the aircraft cabin. The quality of the air within the aircraft cabin can be adjusted by simply opening and closing vents or windows. Many aircraft that are designed to fly at high altitudes and at high speeds also lack air conditioning units. Such aircraft fly at elevations that require pressurized cabins. At such altitudes, the ambient air is cold and air conditioning is not needed. However, if an aircraft cabin is pressurized, fresh ambient air cannot simply be vented into the pressurized cabin from outside the aircraft. Rather, to meet environmental needs, the pressurized air within the pressurized cabin is either cooled or heated, so as to maintain a pressure stabilization within the cabin.

Aircraft that are designed to fly at high altitudes typically have jet engines or turboprop engines. Such turbine engines have compressors that can compress air to pressures above one hundred pounds per square inch. As the air is compressed, it is heated. This heat can be tapped and can be used to heat a pressurized cabin. If air conditioning is utilized, then pressurized air from the engines is used to turn a refrigeration compressor in order to cool the cabin. For such aircraft environmental systems to work, the engine of the aircraft must be running.

Many aircraft only have heaters and rely upon the relatively cold ambient air in flight to cool the aircraft. The problem that occurs is that depending upon the season and location, the tarmac of an airfield can exceed one hundred degrees Fahrenheit. Smaller aircraft spend a lot of time in this environment refueling, taxiing, loading, unloading and waiting for improved weather. Owners of aircraft would like to have the ability to run air conditioning within the aircraft on the tarmac and when flying at low altitudes.

Adding air conditioning systems to aircraft is very expensive and can be highly problematic in view of current FAA regulations. Likewise, repairing and replacing air conditioning systems on aircraft is expensive and subject to multiple regulations. As such, a need exists for an aircraft air conditioning system that is portable and can be added to an aircraft temporarily. Such a system can be removed when the aircraft is inspected, so as to meet current FAA regulations. A need also exists for an aircraft air conditioning unit that can be efficiently run on the tarmac, when the aircraft engines are off or are at idle.

Similar needs also exist in other applications that require the air conditioning of a confined space. For instance, many vehicles require air conditioning, but the engine of the vehicle must be running to power the air conditioning system. As such, a need also exists for an air conditioning unit that can be efficiently run in a vehicle, when the vehicle engine is off or are at idle.

These needs are met by the present invention as described and claimed below.

SUMMARY OF THE INVENTION

The present invention is an air conditioning system that is designed to be retroactively added to, and removed from, an existing aircraft, vehicle, boat, or other space where an isolated compartment and a vented compartment are separated by a wall. In an aircraft, a pressurized cabin is separated from an unpressurized compartment by a rear pressure bulkhead. In vehicle, the passenger compartment is separated from the vented engine compartment by a fire wall. In boats and trailer homes, ceilings and walls separate the passenger compartment from the ambient environment.

The air conditioning system includes a cooler module that is placed into the isolated compartment to be air conditioned. The cooler module circulates and cools the air within the isolated compartment without ducting. The cooler module contains a condenser, an evaporator and a compressor. A voltage control unit is provided to operate the compressor at varying speeds and selectively change the level of air conditioning. The compressor speed is adjusted to meet the particular power limitations available. Accordingly, when an engine is at idle and the electrical alternator produces less power, the compressor speed is adjusted to a lower value to reduce the ampere draw from the electrical system. In this manner, the batteries are not depleted. This manual adjustment is made by reference to a voltage readout on the air conditioning module, to, for example, maintain at least 24 volts in a 24-volt aircraft.

A heat exchanger module is mounted into the vented compartment. The heat exchanger is capable of exchanging heat to the ambient air outside of the aircraft or vehicle. The heat exchanger module is connected to the cooler module with tubes that contain a heat exchanger fluid. Liquid is far superior to removing heat, as compared to air. Furthermore, the use of a liquid eliminates the complexities of troublesome long refrigerant hoses. In order for the tubes to pass between the compartments, fluid couplings are mounted through the wall that separates the compartments. The tubes connect to the fluid couplings on either side of the wall, therein enabling fluid flow between the cooler module and the heat exchanger.

A control unit may also be provided within the isolated compartment for controlling the operations of the cooler module.

BRIEF DESCRIPTION OF THE DRAWINGS

For a better understanding of the present invention, reference is made to the following description of an exemplary embodiments thereof, considered in conjunction with the accompanying drawings, in which.

DETAILED DESCRIPTION OF THE DRAWINGS

The present invention air conditioning system can be used on aircraft, vehicles, boats and in confined spaces such as mobile homes and cabins. Three exemplary embodiments are illustrated to show varied applications. These selected embodiments are selected in order to set forth some of the best modes contemplated for the invention. Accordingly, the exemplary embodiments described and illustrated should not be considered limitations to the appended claims.

Figure 1:
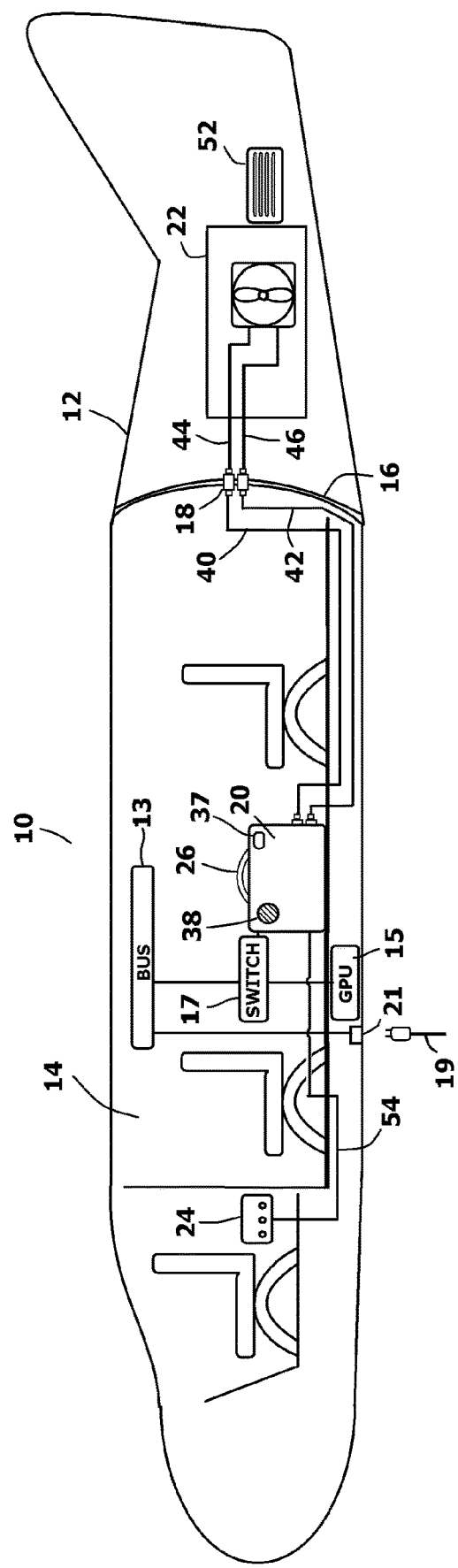
FIG. 1 is a schematic of an exemplary embodiment of the present invention air conditioning system shown integrated into an aircraft.
Figure 2:
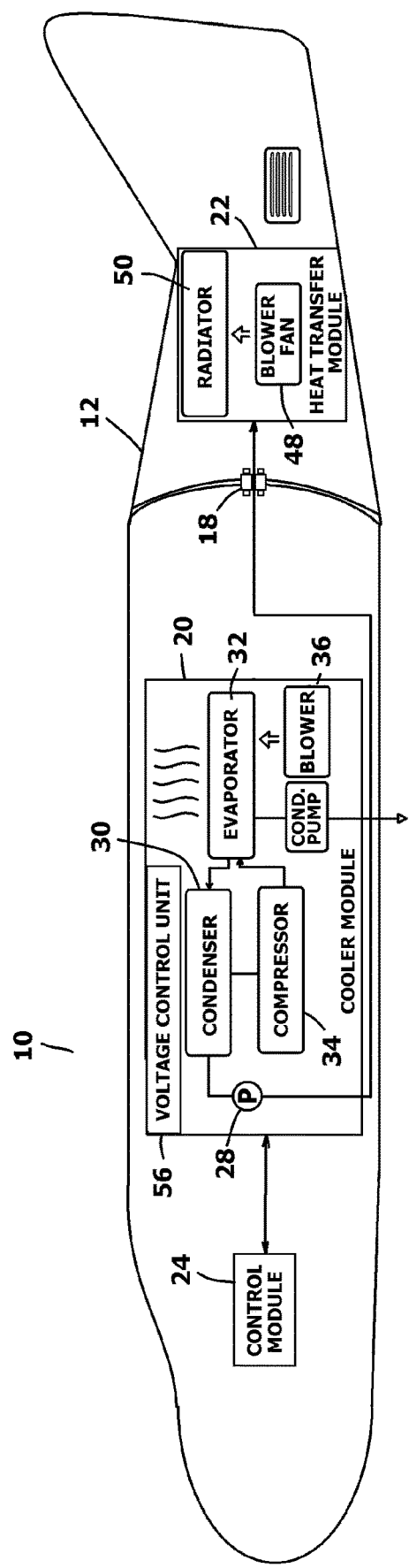
FIG. 2 is a schematic illustrating more details of the various modules contained within the air conditioning system.

Referring to FIG. 1 and FIG. 2, there are schematics of an exemplary embodiment of an air conditioning system 10 as applied to an aircraft 12 that has a pressurized cabin 14. The pressurized cabin 14 has a rear pressure bulkhead 16 positioned toward the rear of the aircraft 12. A set of fluid couplings 18 are set into the rear pressure bulkhead 16 using FAA approved parts and procedures. The installation of the fluid couplings 18 in the bulkhead 16, depending upon the aircraft, can be performed by most any certified mechanic for a few hundred dollars. Any fittings that penetrates a bulkhead in a pressurized aircraft may require an FAA Designated Engineering Representative (DER) approval. If the application of the air conditioning is in a non-pressurized cabin, the fluid couplings 18 become optional.

The air conditioning system 10 is electrically powered via an aircraft electrical bus 13 within the aircraft 12. The air conditioning system 10 can be operated regardless of whether the aircraft 12 is in flight or if its engines are running. A ground power unit (GPU or APU) 15 is generally used to supply power to the aircraft main bus 13 for the air conditioning system 10. If the aircraft 12 is on the tarmac with its engines off, the air conditioning system 10 can also be run by an electrical extension cord 19 that connects to a specialty on-board GPU 15 through an electrical outlet 21 outside of the aircraft 10. The on-board GPU 15 converts the extension cord alternating voltage power to either 12 VDC or 24 VDC aircraft power. A switching box 17 is provided that usually contains two relays so it can selectively connect the air conditioner system either the aircraft electrical bus 13 or the on board GPU 15. The switching box 17 may be controlled near the pilot position.

The complete air conditioning system 10 is comprised of three primary modules that are installed at three different locations within the aircraft 12. The three modules include a cooler module 20, a heat transfer module 22, and an optional control panel module 24. The controls on the cooler module 20 are sufficient to run the air conditioning in a simplified installation, such as, for example, one without the on-board GPU 15. Each of these system modules 20, 22, 24 can be installed into and/or removed from the aircraft 12 as wanted by the aircraft owner. As such, the air conditioning system 10 can be installed during the summer and removed in the winter to save weight. Likewise, the air conditioning system 10 can be removed if required for FAA inspection and certification of the aircraft 12 and eliminate the requirement for FAA Approval of the air conditioning system itself as a permanently installed aircraft installation.

The cooler module 20 is the largest module and is placed inside the passenger cabin 14 in the area to be cooled. The cooler module 20 is a single portable module that is approximately the size of a small suitcase. The cooler module 20 has a handle 26 for easy transport into and out of the aircraft 12. Inside the cooler module 20 are a liquid pump 28, a liquid condenser 30, an evaporator 32, a compressor 34 and at least one blower fan 36. The liquid pump 28, compressor 34 and blower fans 36 are all electrically powered. A condensate pump 39 is provided that expels the condensate that forms around the coils of the evaporator 32. This condensate is pumped from the air conditioner module 20 through a small hose and is pumped overboard and out of the aircraft. Directional vents 38 are coupled to the cooler module 20 adjacent the evaporator 32. During operation of the overall air conditioning unit 10, the evaporator 32 cools and the blower fans 36 circulate air through the evaporator 32. This produces a flow of cooled air that is directed into the pressurized cabin 14 through the directional vents 38.

The air conditioner module 20 also contains a digital voltage readout 37 that indicates the aircraft voltage. A rheostat adjustment (not shown) on the voltage control unit thereby allows adjusting the compressor speed to maintain sufficient aircraft bus voltage when the aircraft generators generate less power with low engine rpm during taxi operations.

The overall air conditioning system 10 utilizes a vapor cycle refrigerant and a heat transfer fluid. In the cooler module 20, the refrigerant undergoes a pressure change and vaporizes in the evaporator 32, therein cooling the evaporator 32. The refrigerant is increased in pressure and converted back into a heated gas/liquid by the compressor 34. In the liquid condenser 30, heat is exchanged between the refrigerant and a heat transfer liquid to liquify the refrigerant. The heat transfer liquid is preferably a propylene glycol solution. The heat transfer fluid travels through a supply hose 40 and a return hose 42 that leads to the set of fluid couplings 18 in the rear pressure bulkhead 16. The supply hose 40 and the return hose 42 can run along a wall of the pressurized cabin 14 or under the floor within the pressurized cabin 14. The length of the hoses 40, 42 depends upon the distance between the cooler module 20 and the rear pressure bulkhead 16.

A second set of hoses 44, 46 connects the fluid couplings 18 to one or more heat transfer modules 22 in the unpressurized compartment 17. The heat transfer module 22 contains a radiator 50 and a blower fan 48. The radiator 50 receives heat transfer fluid through the supply hoses 40, 44 from the pump 28 in the cooler module 20. The radiator 50 is heated by heat transfer fluid and cooled by the blower fan 48. The heat transfer fluid that is cooled by the heat transfer module 22 is returned to the cooler module 20 via the return hoses 42. The excess heat is vented out of the aircraft 12. The heat may be vented through a vent panel 52 in the tail empennage. If such a vent panel 52 is not present, a vent can be provided by replacing a solid access panel cover with a corresponding cover with vent openings.

The cooler module 20 has a power umbilical 54 that is wired to a power source such as the aircraft main power bus 13 within the aircraft 12. The umbilical cord 54 also supplies power to the heat exchanger module 22 through separate wiring to operate the blower 48 in the heat exchanger. Additionally, the separate power to the heat exchanger may also energize a second liquid pump near the heat exchanger to expedite the liquid flow, in case the liquid lines 40 and 42 are excessively long and impede flow. The optional control module 24 is the control interface for the overall air conditioning system 10. The control module 24 can be mounted in any location, but is preferably mounted in the cockpit where the control module 24 can be utilized by a pilot and/or co-pilot.

The air conditioning system 10 is designed to be retroactively added to different aircraft. Different aircraft have different electrical systems and different alternators. For instance, many aircraft have 12-volt electrical systems, while other aircraft have 24-volt electrical systems. A GPU Unit is often mounted in the aircraft to permit air conditioner operation for an alternating voltage extension cord when the aircraft is on the ground. The cooler module 20 optimally runs on an aircraft that has an alternator that provides at least 70 amps of current. However, using the voltage control unit 56, the speed of the compressor 34, can be slowed into a 20 Amp to 40 Amp range for 24-volt systems and typically 25 Amp to 50 Amps for 12-volt systems. This enables the air condition system 10 to be adaptable to the electrical limitations of most aircraft.

Figure 3:
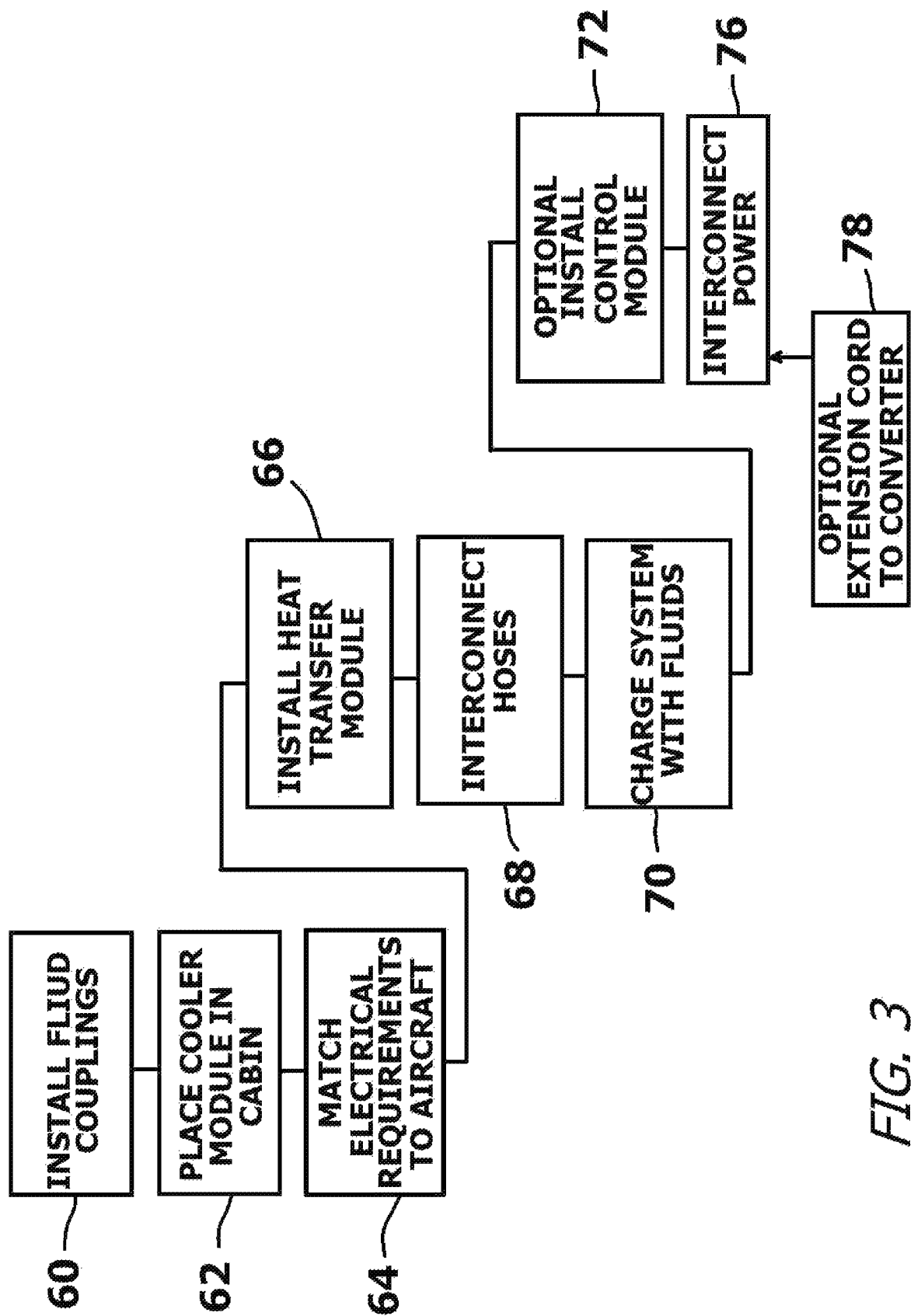
FIG. 3 is a block diagram logic flow showing a method of installation for the air conditioning system in an aircraft.

Referring to FIG. 3 in conjunction with FIG. 1 and FIG. 2, it will be understood that to install the air conditioning system 10 in an aircraft, the two quick-connect fluid couplings 18 are installed into the rear bulkhead 16 of the aircraft 12. In addition, a two-pin electrical bulkhead connector, commonly available, is also connected at the bulkhead to carry electrical power to the heat exchanger blower 48. See Block 60. The air conditioning system 10 is provided, having the cooler module 20, heat transfer module 22 and control module 24. The cooler module 20 is placed into the cabin 14. See Block 62. The heat exchange module 22 is placed in the unpressurized compartment 17 behind the pressurized cabin 14 in the case of a pressurized cabin installation. See Block 66. The cooler module 20 and the heat transfer module 22 are interconnected with hoses 40, 42, 44, 46 that are run through convenient locations in the aircraft 12. See Block 68. The cooler module 20, heat transfer module 22 and hoses 40, 42, 44, 46 are filled with the appropriate heat transfer fluids. See Block 70.

The control module 24 is mounted in the cockpit of the aircraft 12. See Block 72. The air conditioning system 10 is than connected to the electrical system of the aircraft 12 and to an external power extension cord plug 19. See Block 76. The air conditioning system 10 is then ready to operate, using either the electricity generated by the aircraft 12 bus and/or electricity received through the external extension power plug 21. When the engines of the aircraft 12 are operating, the air conditioning system 10 can run from power provided through the alternator of the aircraft 12. On the tarmac, with the engines off, the air conditioning system 10 can run from auxiliary power provided through the external power plug 21 or from the aircraft power bus 13 if the power bus 13 is supplemented by a commonly used external APU/GPU. The extension cord power plug connects to either 120 volts or 220 volts for ground pre-cooling with the optional installed GPU unit that converts regular 120 volt or 220-volt AC power to 12 volts or 24 volts. See Block 78.

Figure 4:
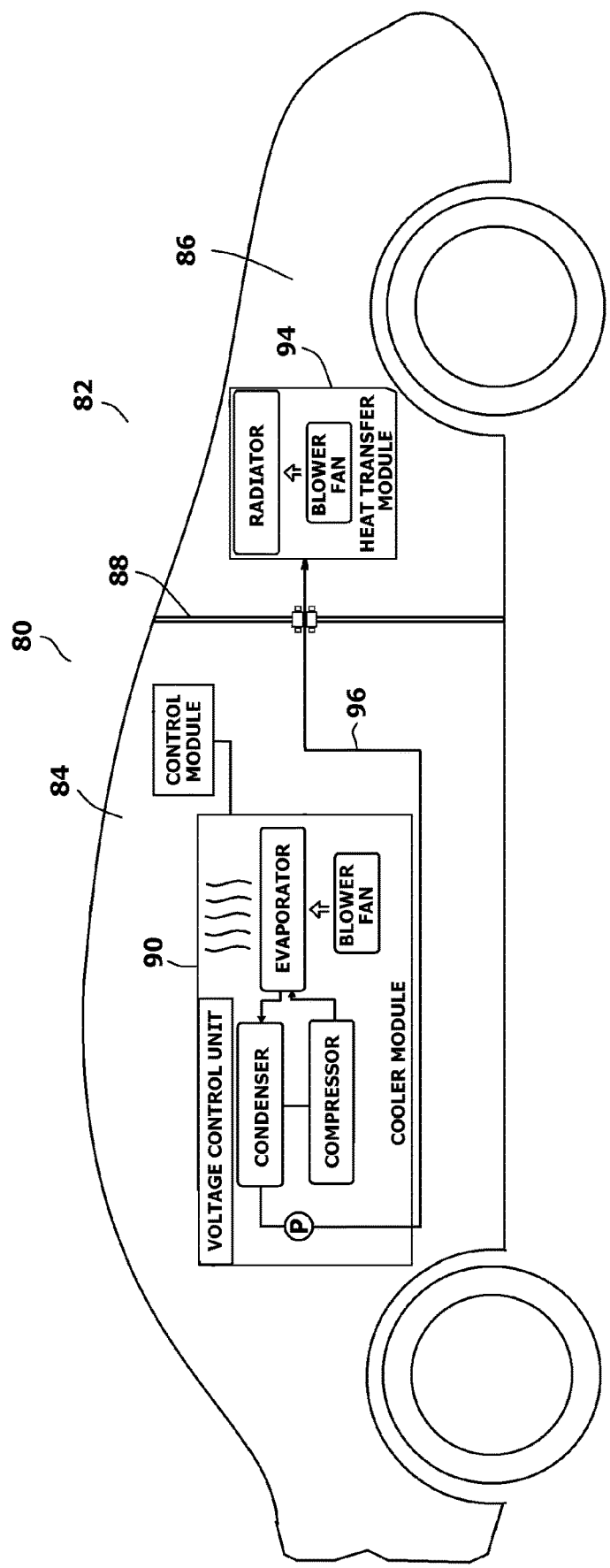
FIG. 4 is a schematic of an exemplary embodiment of the present invention air conditioning system shown integrated into a vehicle.

Referring to FIG. 4, the present invention air conditioning system 80 is shown applied to a vehicle 82. The vehicle 82 has a passenger compartment 84 and a vented engine compartment 86. The passenger compartment 84 and the vented engine compartment 86 are separated by a firewall 88. A cooler module 90 is placed in the passenger compartment 84. The cooler module 90 is the same as that previously described. A heat transfer module 94 is placed in the vented engine compartment 86. The heat transfer module 94 is the same at that previously described. Hoses 96 interconnect the cooler module 90 and the heat transfer module 94, wherein the hoses 96 extend through the firewall 88 of the vehicle 82. The operation of the air conditioning system 90 is the same as was previously described for use in an airplane application.

Figure 5:
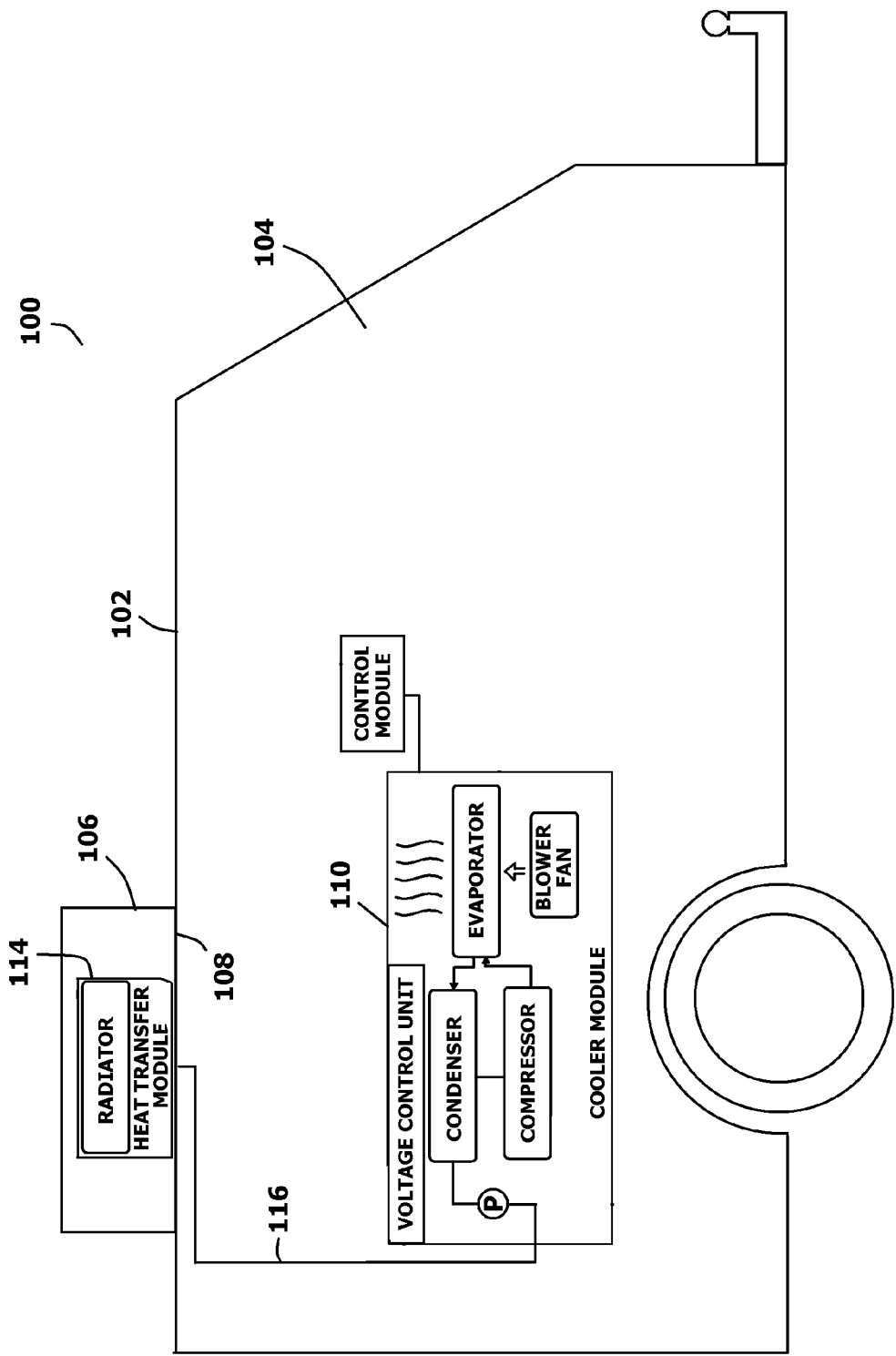
FIG. 5 is a schematic of an exemplary embodiment of the present invention air conditioning system shown integrated into a mobile home.

Referring to FIG. 5, the present invention air conditioning system 100 is shown applied to a trailer home 102. The trailer home 102 has a living compartment 104 and a roof vent 106. The living compartment 104 and the roof vent 106 are separated by a ceiling 108. A cooler module 110 is placed in the living compartment 104. The cooler module 110 is the same as that previously described. A heat transfer module 114 is placed in the roof vent 106. The heat transfer module 114 is the same at that previously described. Hoses 116 interconnect the cooler module 110 and the heat transfer module 114, wherein the hoses 116 extend through the ceiling 108 of the trailer home 102. The operation of the air conditioning system 100 is the same as was previously described for use in an airplane application.

Figure 6:
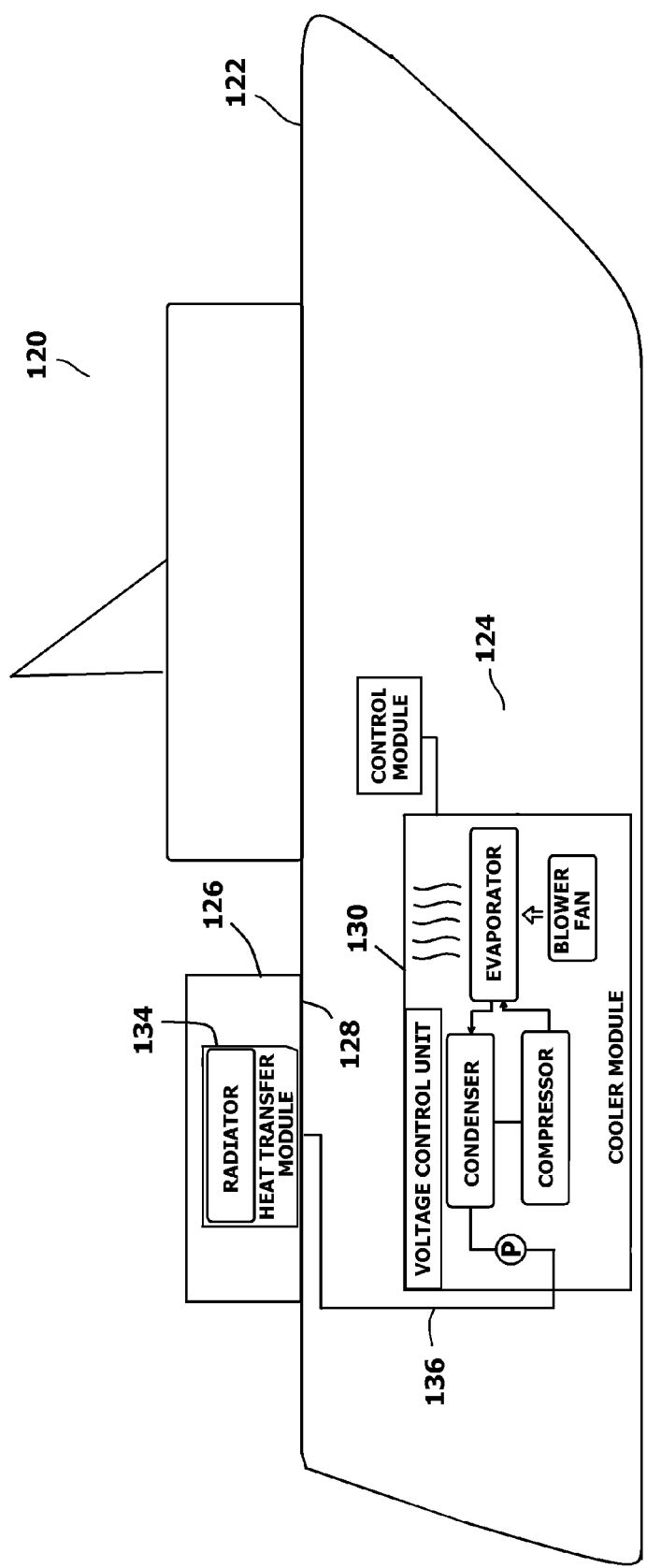
FIG. 6 is a schematic of an exemplary embodiment of the present invention air conditioning system shown integrated into a boat.

Referring to FIG. 6, the present invention air conditioning system 120 is shown applied to a boat 122. The boat 122 has a living compartment 124 and a deck vent 126. The living compartment 124 and the deck vent 126 are separated by the deck 128. A cooler module 130 is placed in the living compartment 124. The cooler module 130 is the same as that previously described. A heat transfer module 134 is placed in the deck vent 126. The heat transfer module 134 is the same at that previously described. Hoses 136 interconnect the cooler module 120 and the heat transfer module 134, wherein the hoses 136 extend through the deck 128 of the boat 122. The operation of the air conditioning system 120 is the same as was previously described for use in an airplane application.

It will be understood that the embodiments of the present invention that are described and illustrated are merely exemplary and that a person skilled in the art can make many variations to the shown embodiments using functionally equivalent components and configurations. All such alternate embodiments, modifications and variations are intended to be included within the scope of the present invention, as defined by the claims.

What is claimed is:

1. In an aircraft having a pressurized cabin with a rear pressure bulkhead and an unpressurized compartment behind said rear pressure bulkhead, an air conditioning system for retroactive installation into said aircraft, said system comprising:

a cooler module containing heat transfer fluid, a condenser, an evaporator, and a compressor, wherein said cooler module is contained within a portable housing that can be carried into, and out of, said pressurized cabin as a unit;

a heat exchanger mounted in said unpressurized compartment;

two fluid couplings installed in said rear pressure bulkhead, wherein said two fluid couplings enable said heat transfer fluid to flow between said pressurized cabin and said unpressurized compartment;

a first set of tubing that interconnects said cooler module in said pressurized cabin to said two fluid couplings; and a second set of tubing that interconnects said heat exchanger in said unpressurized compartment to said two fluid couplings, wherein said first set of tubing, said two fluid couplings and said second set of tubing enable said heat transfer fluid to flow between said cooler module in said pressurized cabin and said heat exchanger in said unpressurized compartment.

2. The system according to claim 1, wherein said cooler module contains at least one blower for moving air across said evaporator within said pressurized cabin.

3. The system according to claim 1, wherein said cooler module has an adjustable operating voltage.

4. The system according to claim 1, further including at least one alternate blower for selectively moving air across said heat exchanger within said unpressurized compartment.

5. The system according to claim 1, further including a power plug receptacle that is electrically coupled to said cooler module, wherein said power plug receptacle can receive electrical power from a source outside of said aircraft.

6. The system according to claim 1, wherein said aircraft has a first operating voltage and said cooler module has a second operating voltage that can be selectively adjusted to match said first operating voltage.

7. The system according to claim 1, further including a vent in said unpressurized compartment of said aircraft.

8. The system according to claim 1, further including a power plug receptacle that is electrically coupled to said cooler module, wherein said power plug receptacle can receive electrical power from a source outside of said aircraft.

9. In a vehicle having a first compartment and a second compartment that are separated by a barrier, an air conditioning system for retroactive installation into said vehicle, said system comprising:

a cooler module containing a heat transfer fluid, a condenser, an evaporator, and a compressor, wherein said cooler module is contained within a portable housing that can be carried into, and out of, said first compartment as a unit;

a heat exchanger mounted in said second compartment;

two fluid couplings installed in said barrier, wherein said two fluid couplings enable said heat transfer fluid to flow between said first compartment and said second compartment; and a first set of tubing that interconnects said cooler module in said first compartment to said fluid couplings; and a second set of tubing that interconnects said heat exchanger in said second compartment to said fluid couplings, wherein said first set of tubing, said two fluid couplings, and said second set of tubing enable said heat transfer fluid to flow between said cooler module and said heat exchanger.

10. The system according to claim 9, wherein said cooler module contains at least one blower for moving air across said evaporator within said first compartment.

11. The system according to claim 9, wherein said cooler module has an adjustable operating voltage.

12. The system according to claim 9, further including at least one alternate blower for selectively moving air across said heat exchanger within said second compartment.

13. The system according to claim 9, further including a power plug receptacle that is electrically coupled to said cooler module, wherein said power plug receptacle can receive electrical power from a source outside of said vehicle.

* * * * *